United States Patent Office 3,351,633
Patented Nov. 7, 1967

3,351,633
4-OXA-19-NORPREGNAN-17α-OL-3,20-DIONES
AND DERIVATIVES
Alexander D. Cross, Mexico City, Mexico, assignor to Syntex Corporation, Panama, Panama, a corporation of Panama
No Drawing. Filed Oct. 14, 1965, Ser. No. 496,188
18 Claims. (Cl. 260—343.2)

This application is a continuation-in-part of copending U.S. patent application Ser. No. 353,245, filed Mar. 19, 1964, now abandoned.

This invention relates to novel cyclopentanopolyhydrophenanthrene derivatives and to processes for the preparation thereof.

More particularly, this invention relates to novel 3-keto-4-oxa-19-nor-5α- and 5β-pregnane derivatives represented by the general formula:

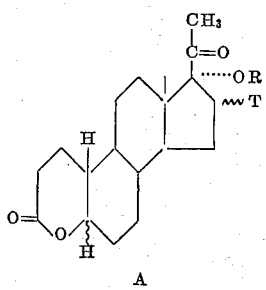

A

In this formula R represents hydrogen or an acyl group, T represents hydrogen, an α-hydroyl group, an α-acyloxy group, α-methyl or β-methyl and R and T taken together represent the grouping:

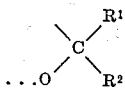

wherein $R^1$ represents a lower alkyl group or a lower aryl group containing up to 8 carbon atoms, inclusive e.g., methyl, ethyl, propyl, phenyl, tolyl, xylyl, benzyl, and the like, and $R^2$ represents hydrogen or a lower alkyl group.

The acyl and acyloxy groups referred to herein are preferably derived from hydrocarbon carboxylic acids containing less than 12 carbon atoms. These acids may be saturated or unsaturated (including aromatic), and can be straight or branched-chain, cyclic or cyclic-aliphatic. In addition, they may be substituted with one or more functional groups, such as hydroxyl groups, alkoxy groups containing up to 6 carbon atoms, acyloxy groups containing up to 12 carbon atoms, nitro groups, amino groups and halogen atoms. Included among such ester groups are the acetate, trimethylacetate, t-butylacetate, aminoacetate, phenoxyacetate, propionate, cyclopentylpropionate, β-chloropropionate, caproate, enanthate, adamantoate, benzoate, and the like.

The novel 3-keto-4-oxa-19-nor-5α- and 5β-pregnane derivatives represented by Formula A hereinabove are progestational agents having oral activity. In addition, they have anti-androgenic, anti-estrogenic, anti-gonadotrophic and diuretic properties, and are useful in fertility control, in the treatment of premenstrual tension and in lowering blood cholesterol levels.

These novel compounds can be prepared by a process which can be illustrated schematically as follows:

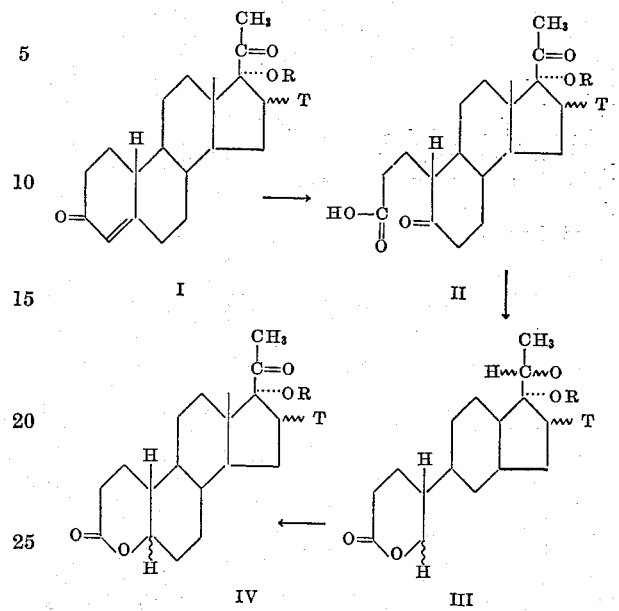

In these formulas R and T have the same meanings as set forth hereinabove for Formula A.

In carrying out this process the starting material I, e.g., 19-nor-Δ⁴-pregnen-17α-ol-3,20-dione 17-acetate (I; R=acetyl, T=hydrogen), dissolved in an organic solvent such as methylene dichloride, ethyl acetate (which can contain trace or larger amounts of acetic acid), or the like, is reacted with a stream of ozone at a temperature of from about —100° C. to about —20° C., and preferably at about —70° C., until excess ozone is present in the reaction mixture, and then with from about 0.5% to about 5% by volume, and preferably about 1% by volume, based on the volume of the ozonized solution, of an aqueous 30% solution of hydrogen peroxide (or with an equivalent amount of aqueous hydrogen peroxide solution of a different concentration), at a temperature of from about —20° C. to about 30° C., and preferably at room temperature about 25° C.) for from about 10 to about 40 hours, thus giving the corresponding 19-nor-3,5-seco-5-one-3-oic acid II, e.g., 19-nor-3,5-seco-pregnan-17α-ol-5,20-dione-3-oic acid 17-acetate (II; R=acetyl, T=hydrogen).

The thus-obtained 19-nor-3,5-seco-5-one-3-oic acid is then dissolved in an ether such as dioxane, tetrahydrofuran, or the like, and reduced with an alkali metal borohydride, such as sodium borohydride or the like, at a temperature of about 0° C. for from about 12 to about 24 hours, thus giving, after acidification of the clear solution with a strong acid, e.g., a strong mineral acid such as hydrochloric acid or the like, preferably in an amount sufficient to give a pH of from about 1 to 4, a mixture of the corresponding 4-oxa-19-nor-5α-pregnan-20α-ol-3-one, 4-oxa-19-nor-5β-pregnan-20α-ol-3-one, 4-oxa-19-nor-5α-pregnan-20β-ol-3-one, and 4-oxa-19-nor-5β-pregnan-20β-ol-3-one III e.g., a mixture of 4-oxa-19-nor-5α-pregnane-17α,20α-diol-3-one 17-acetate, 4-oxa-19-nor-5β-pregnane-17α,20α-diol-3-one 17-acetate, 4-oxa-19-nor-5α-pregnane-17α,20β-diol-3-one 17-acetate, and 4- oxa-19-nor-5β-pregnane - 17α,20β-diol-3-one 17 - acetate (III; R=acetyl, T=hydrogen), which can be separated into the individual isomers by fractional crystallization or standard chromatographic techniques. Alternatively, the mixture of 5- and 20-isomers, or the later-obtained mixture of 5α- and 5β-isomers, can be used as such in any subsequent reactions and the product then separated into the individual isomers.

By oxidizing the 20-ol III with chromium trioxide in pyridine or the like, preferably at room temperature for from about 12 to about 24 hours, the 17α-hydroxyl group, and preferably a 16α-hydroxyl group as well, if present, being protected by acylation or through formation of a cycloalkylidenedioxy derivative, the corresponding 20-one IV, e.g., 4-oxa-19-nor-5α(and/or 5β)-pregnan-17α-ol-3,20-dione 17-acetate (IV; R=acetyl, T=hydrogen), is obtained.

In addition to being prepared from 16α-hydroxyl or -acyloxy or 16α,17α-cycloalkylidenedioxy-containing starting materials, the final products of the present invention containing these 16 substituents can also be prepared from a 16-desoxy-20-one IV, e.g., 4-oxa-19-nor-5α(and/or 5β)-pregnan-17α-ol-3,20-dione (IV; R=hydrogen, T=hydrogen), by first incubating with *Streptomyces roseochromogenus*, thereby giving the corresponding 16α-hydroxy steroid, e.g., 4-oxa-19-nor-5α(and/or 5β)-pregnane-16α,17α-diol-3,20-dione (IV; R=hydrogen and T=hydroxyl).

Esterification of the 16α-hydroxyl group by conventional procedures, such as by reacting with an acid chloride or anhydride, e.g., one corresponding to the hydrocarbon carboxylic acids mentioned hereinabove, in pyridine or the like at room temperature for from about 12 to about 24 hours, or when it is desired to also acylate a 17α-hydroxyl group, by reacting with a mixture of an acid anhydride and the corresponding acid in the presence of a strong acid catalyst, e.g., p-toluenesulfonic acid or the like, at room temperature for from about 12 to about 24 hours gives the corresponding 16α-acyloxy compound or 16α,17α-diacetoxy compound respectively. Thus, for example, by reacting 4-oxa-19-nor-5α(and/or 5β)-pregnane-16α,17α-diol-3,20-dione with a mixture of acetic anhydride and acetic acid in the presence of p-toluenesulfonic acid in the manner described above, the corresponding 16α,17α-diacetate (IV; R=acetyl and T=acetoxy) is obtained.

When preparing 16-methyl derivatives, the 16-methyl starting materials I can be obtained in the manner described in U.S. Patent No. 3,065,228 to Bowers, i.e., by first oxidizing 16(α or β)-methyl-17α,19-dihydroxypregnenolone to give the corresponding 16(α or β)-methyl-Δ⁴-pregnen-17α-ol-19-(ol, one or oic acid)-3,20-dione, from which the oxygenated 10β-methyl group is then eliminated by conventional procedures, thus giving 16(α or β) - methyl-19-nor-Δ⁴-pregnen-17α-ol-3,20-dione (I; R=hydrogen, T=methyl). This compound can then be esterified at the 17-position, if desired, in the manner described hereinabove.

An illustrative but by no means exhaustive listing of 3-keto-4-oxa-19-nor-5α- and 5β-pregnane derivatives falling within the scope of formula A hereinabove which can be prepared by the above-illustrated process includes:

4-oxa-19-nor-5α-pregnan-17α-ol-3,20-dione,
4-oxa-19-nor-5α-pregnan-17α-ol-3,20-dione 17-acetate,
4-oxa-19-nor-5β-pregnan-17α-ol-3,20-dione,
4-oxa-19-nor-5β-pregnan-17α-ol-3,20-dione 17-caproate,
4-oxa-19-nor-5α-pregnane-16α,17α-diol-3,20-dione,
4-oxa-19-nor-5α-pregnane-16α,17α-diol-3,20-dione 16,17-diacetate,
4-oxa-19-nor-5β-pregnane-16α,17α-diol-3,20-dione 16,17-dipropionate,
4-oxa-16α,17α-disopropylidenedioxy-19-nor-5α-pregnane-3,20-dione,
4-oxa-16α,17α-isopropylidenedioxy-19-nor-5β-pregnane-3,20-dione,
4-oxa-16α-methyl-19-nor-5α-pregnan-17α-ol-3,20-dione,
4-oxa-16α-methyl-19-nor-5α-pregnan-17α-ol-3,20-dione 17-acetate,
4-oxa-16β-methyl-19-nor-5α-pregnan-17α-ol-3,20-dione,
4-oxa-16β-methyl-19-nor-5α-pregnan-17α-ol-3,20-dione 17-acetate,
4-oxa-16α-methyl-19-nor-5β-pregnan-17α-ol-3,20-dione,
4-oxa-16α-methyl-19-nor-5β-pregnan-17α-ol-3,20-dione 17-acetate,
4-oxa-16β-methyl-19-nor-5β-pregnan-17α-ol-3,20-dione,
4-oxa-16β-methyl-19-nor-5β-pregnan-17α-ol-3,20-dione 17-acetate, and the like.

The following examples will serve to further typify the nature of the invention but should not be construed as a limitation thereof.

*Example I*

A solution of 5.2 grams of 19-nor-Δ⁴-pregnen-17α-ol-3,20-dione, 50 cc. of glacial acetic acid and 50 cc. of ethyl acetate, contained in an oxonation tube, was cooled in an acetone-Dry Ice bath to about −70° C. At this point, a stream of ozone (0.024 mol/hour) was passed through the solution for 2 hours, following which 20 cc. of water and 3 cc. of an aqueous 30% hydrogen peroxide solution were added, with vigorous stirring. The resulting mixture was stirred for 17 hours at room temperature, and then allowed to stand at room temperature for 48 hours. Following this reaction period the solution was concentrated to a small volume under reduced pressure on a steam bath, then diluted with 20 cc. of methanol and poured into water. The thus-obtained mixture was extracted with diethyl ether, and the resulting extract was washed with water, then dried over anhydrous sodium sulfate and evaporated to dryness. Chromatography of the resulting residue on 250 grams of alumina gave 19-nor-3,5-secopregnan-17α-ol-5,20-dione-3-oic acid.

This procedure was then repeated in every detail but one, 17α-hydroxy-19-norprogesterone being replaced by 19-nor-Δ⁴-pregnen-17α-ol-3,20-dione 17-acetate,
16α,17α-isopropylidenedioxy-19-nor-Δ⁴-pregnene-3,20-dione,
16α-methyl-19-nor-Δ⁴-pregnen-17α-ol-3,20-dione,
16α-methyl-19-nor-Δ⁴-pregnen-17α-ol-3,20-dione 17-acetate,
16β-methyl-19-nor-Δ⁴-pregnen-17α-ol-3,20-dione, and
16β-methyl-19-nor-Δ⁴-pregnen-17α-ol-3,20-dione 17-acetate respectively. In each case, the corresponding 19-nor-3,5-seco-5-one-3-oic acid, namely, 19-nor-3,5-secopregnan-17α-ol-5,20-dione-3-oic acid 17-acetate,
16α,17α-isopropylidenedioxy-19-nor-3,5-secopregnane-5,20-dione-3-oic acid,
16α-methyl-19-nor-3,5-secopregnan-17α-ol-5,20-dione-3-oic acid,
16α-methyl-19-nor-3,5-secopregnan-17α-ol-5,20-dione-3-oic acid 17-acetate,
16β-methyl-19-nor-3,5-secopregnan-17α-ol-5,20-dione-3-oic acid, and
16β-methyl-19-nor-3,5-secopregnan-17α-ol-5,20-dione-3-oic acid 17-acetate, respectively, was obtained.

*Example II*

A solution of 1 gram of sodium borohydried in 3 cc. of water was added to an ice-cold solution of 1 gram of 19-nor-3,5-seco-pregnan-17α-ol-5,20-dione-3-oic acid in 120 cc. of dioxane, and the resulting reaction mixture was allowed to stand for 16 hours at 0° C. Following this reaction period the pH of the reaction mixture was adjusted to 1 by the addition of 6 N hydrochloric acid (this also served to decompose the excess sodium borohydride present) and the resulting precipitate was collected by filtration. Recrystallization from acetone/hexane gave a mixture of 4-oxa-19-nor-5α-pregnan-17α,20α-diol - 3 - one; 4-oxa-19-nor-5β-pregnan-17α,20α-diol-3-one; 4-oxa-19-nor-5α-pregnan-17α,20β-diol-3-one and 4-oxa - 19-nor-5β-pregnane-17α,20β-diol-3-one, which was used as such as the starting material for the reaction of Example III hereinbelow.

By repeating this procedure using the remaining 19-nor-3,5-seco-5-one-3-oic acids prepared as described in Example I hereinabove as the steroid starting materials, the corresponding 4-oxa-19-nor-5(α and β)-pregnane-17α, 20(α and β)-diol-3-ones were obtained.

*Example III*

One gram of a mixture of 4-oxa-19-nor-5α-pregnane-17α,20α - diol-3-one; 4-oxa-19-nor-5β-pregnane-17α,20α-diol-3-one; 4-oxa-19-nor-5α-pregnane-17α,20β-diol-3-one and 4-oxa-19-nor-5β-pregnane-17α,20β-diol-3-one, prepared as described in Example II hereinabove, was dissolved in 20 cc. of pyridine and then added to a mixture of 1 gram of chromium trioxide in 20 cc. of pyridine. The resulting reaction mixture was allowed to stand at room temperature overnight. Following this reaction period the reaction mixture was diluted with ethyl acetate and filtered through Celite diatomaceous earth. The filtrate was thoroughly washed with water, dried over anhydrous sodium sulfate and evaporated to dryness. Crystallization of the resulting residue from acetone/hexane gave a mixture of 4-oxa-19-nor-5α-pregnan-17α-ol-3,20-dione and 4 - oxa-19-nor-5β-pregnan-17α-ol-3,20-dione, which was then separated into the individual isomers by fractional crystallization.

This procedure was then repeated in every detail but one, namely, the mixture of 4-oxa-19-nor-5(α and β)-pregnan-20(α and β)-ol-3-one used as the steroid starting material was replaced by the remaining mixtures of 4-oxasteroids, prepared as described in Example II. In each case, the corresponding mixture of 5α- and 5β-20-ones, namely, 4-oxa-19-nor-5(α and β)-pregnane-17α-ol-3,20-dione 17-acetate, 4-oxa-16α,17α-isopropylidenedioxy - 19-nor-5(α and β)-pregnane-3,20-dione, 4-oxa-16α-methyl-19-nor-5(α and β)-pregnan-17α-ol-3,20-dione, 4-oxa-16α-methyl-19-nor-5(α and β)-pregnan-17α-ol-3,20-dione 17-acetate, 4-oxa-16β-methyl-19-nor-5(α and β)-pregnan-17α-ol-3,20-dione, and 4-oxa-16β-methyl-19-nor-5(α and β)-pregnan-17α-ol-3,20-dione 17-acetate, respectively, was obtained, and was then separated into the individual isomers by fractional crystallization.

*Example IV*

A mixture of 1 gram of 4-oxa-19-nor-5α-pregnan-17α-ol-3,20-dione, 50 cc. of acetic acid, 25 cc. of acetic anhydride and 1 gram of p-toluenesulfonic acid monohydrate was allowed to stand at room temperature for 24 hours. Following this reaction period the reaction mixture was poured into water and stirred until excess acetic anhydride had hydrolized, and the product was extracted with methylene dichloride. The thus-obtained extract was washed with water until neutral, then dried over anhydrous sodium sulfate and evaporated to dryness. Crystallization of the resulting residue from acetone/diethyl ether gave 4-oxa-19-nor-5α-pregnan-17α-ol - 3,20 - dione 17 - acetate, identical to that prepared from 4-oxa-19-nor-5α-pregnane-17α,20(α and β)-diol-3-one 17-acetate in the manner described in Example III hereinabove.

By repeating this procedure using 4-oxa-19-nor-5β-pregnan-17α-ol-3,20-dione, 4-oxa-16α-methyl-19-nor - 5α-pregnan-17α-ol-3,20-dione, 4-oxa-16α-methyl-19-nor - 5β-pregnan-17α-ol-3,20-dione, 4-oxa-16β-methyl-19-nor - 5α-pregnan-17α-ol-3,20-dione, and 4-oxa-16β-methyl-19-nor-5β-pregnan-17α-ol-3,20-dione, respectively, as the steroid starting materials, the corresponding 17-acetates, identical to those prepared as described in Example III hereinabove, were obtained.

Similarly, by using each of the fre 17α-ols mentioned above as the steroid starting material, and replacing the mixture of acetic acid and acetic anhydride with mixtures of propionic acid and propionic anhydride, cyclopentylpropionic acid and cyclopentylpropionic anhydride, caproic acid and caproic anhydride, and enanthic acid and enanthic anhydride, respectively, the corresponding 17-propionates, -cyclopentylpropionates, -caproates and -enanthates were obtained.

*Example V*

A culture of *Streptomyces rosechromogenus*, ATCC No. 3347, was prepared in an inclined agar medium containing 1% by weight of glucose and 1% by weight of yeast extract, each of these percentages being based on the total weight of said agar medium. A number of 250 cc. Erlenmeyer flasks, each containing 50 cc. of a sterilized aqueous medium containing 2% by weight of peptone and 5% by weight of corn syrup, said percentages being based on the total weight of said aqueous medium, were then innoculated with 1 cc. of a suspension of the above-prepared culture, and the resulting mixtures were then incubated, with aeration and agitation, at 28° C. for 48 hours. This gave a vegetating, growing culture of *Streptomyces roseochromogens*.

Next, 10 mg. of 4-oxa-19-nor-5α-pregnan-17α-ol-3,20-dione were added to each flask, and the resulting mixtures were stirred for 72 hours at room temperature, with aeration. Following this incubation period the incubated mixtures were combined and extracted with methylene dichloride. The thus-obtained extract was washed with water dried over anhydrous sodium sudfate, filtered, and evaporated to dryness under reduced pressure. The resulting residue was chromatographed on silica gel, thus giving 4-oxa-19-nor-5α-pregnane-16α,17α-diol-3,20-dione.

By repeating this procedure in every detail but one, namely, replacing 4-oxa-19-nor-5α-pregnan-17α-ol - 3,20-dione with the corresponding 5β-isomer, 4-oxa-19-nor-5β-pregnane-16α,17α-diol-3,20-dione was obtained.

*Example VI*

By repeating the procedure of Example IV hereinabove using 4-oxa-19-nor-5α-pregnane-16α,17α-diol-3,20 - dione and 4-oxa-19-nor-5β-pregnane-16α,17α-diol-3,20-dione, respectively, as the steroid starting material, the corresponding 16,17-diacetates were obtained.

It will be obvious to those skilled in the art that other changes and variations can be made in carrying out the present invention without departing from the spirit and scope thereof as defined in the appended claims.

I claim:

1. A compound represented by the general formula:

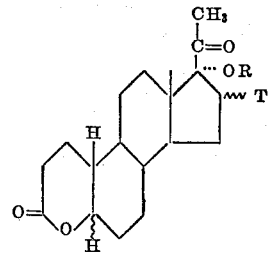

wherein R is selected from the group consisting of hydrogen, hydrocarbon carboxylic acyl containing less than 12 carbon atoms, T is selected from the group consisting of hydrogen, α-hydroxyl, α-hydrocarbon carboxylic acyloxy containing less than 12 carbon atoms, α-methyl and β- methyl, and R and T taken together represent the grouping

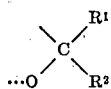

wherein R¹ is selected from the group consisting of lower alkyl and lower aryl containing up to 8 carbon atoms, inclusive, and R² is selected from the group consisting of hydrogen and lower alkyl.

2. 4-oxa-19-nor-5α-pregnan-17α-ol-3,20-dione.
3. 4-oxa-19-nor-5α-pregnan-17α-ol-3,20-dione acetate.
4. 4-oxa-19-nor-5α-pregnan-17α-ol - 3,20 - dione propi-
5. 4-oxa-19-nor-5α-pregnan-17α-ol - 3,20 - dione propionate.
6. 4-oxa-19-nor-5α-pregnan-17α-ol - 3,20 - dione enanthate.
7. 4-oxa-19-nor-5α-pregnan-17α-ol - 3,20 - dione cyclopentylpropionate.
8. 4-oxa-16α-methyl-19-nor-5α-pregnan-17α - ol - 3,20-dione.
9. 4-oxa-16β-methyl-19-nor-5α-pregnan-17α - ol - 3,20-dione.
10. 4-oxa-19-nor-5β-pregnan-17α-ol-3,20-dione.
11. 4-oxa-16α-methyl-19-nor-5β-pregnan-17α-ol - 3,20-dione.
12. 4-oxa-16β-methyl-19-nor-5β-pregnan-17α - ol - 3,20-dione.
13. A hydrocarbon carboxylic acid ester of less than 12 carbon atoms of 4-oxa-19-nor-5α-pregnan-17α-ol-3,20-dione.
14. A hydrocarbon carboxylic acid ester of less than 12 carbon atoms of 4-oxa-16α-methyl-19-nor-5α-pregnan-17α-ol-3,20-dione.
15. A hydrocarbon carboxylic acid ester of less than 12 carbon atoms of 4-oxa-16β-methyl-19-nor-5α-pregnan-17α-ol-3,20-dione.
16. A hydrocarbon carboxylic acid ester of less than 12 carbon atoms of 4-oxa-19-nor-5β-pregnan-17α-ol-3,20-dione.
17. A hydrocarbon carboxylic acid ester of less than 12 carbon atoms of 4-oxa-16α-methyl-19-nor-5β-pregnan-17α-ol-3,20-dione.
18. A hydrocarbon carboxylic acid ester of less than 12 carbon atoms of 4-oxa-16β-methyl-19-nor-5β-pregnan-17α-ol-3,20-dione.

No references cited.

WALTER A. MODANCE, *Primary Examiner.*

JOHN D. RANDOLPH, JAMES A. PATTEN,
*Examiners.*

UNITED STATES PATENT OFFICE
CERTIFICATE OF CORRECTION

Patent No. 3,351,633                                      November 7, 1967

Alexander D. Cross

It is hereby certified that error appears in the above numbered patent requiring correction and that the said Letters Patent should read as corrected below.

Column 2, formula III, should appear as shown below instead of as in the patent:

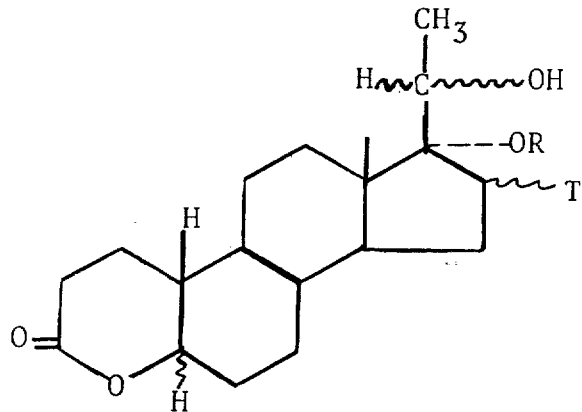

Signed and sealed this 26th day of November 1968.

(SEAL)
Attest:

EDWARD M. FLETCHER, JR.
Attesting Officer

EDWARD J. BRENNER
                         Commissioner of Patents